United States Patent
Ly (12)

(10) Patent No.: US 6,971,094 B1
(45) Date of Patent: Nov. 29, 2005

(54) DEPLOYED AGENT USED IN THE INSTALLATION AND MAINTENANCE OF SOFTWARE

(75) Inventor: Huey Ly, Buena Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 451 days.

(21) Appl. No.: 09/510,747

(22) Filed: Feb. 22, 2000

(51) Int. Cl.[7] .................................................. G06F 9/44
(52) U.S. Cl. ...................................... 717/172; 717/177
(58) Field of Search ................................. 717/168, 174, 717/171, 172, 176, 177; 709/202, 208

(56) References Cited

U.S. PATENT DOCUMENTS

| | | | |
|---|---|---|---|
| 5,367,635 A * | 11/1994 | Bauer et al. ................. 709/202 |
| 5,586,304 A * | 12/1996 | Stupek et al. ................ 707/201 |
| 5,638,494 A * | 6/1997 | Pinard et al. ................ 709/202 |
| 5,822,543 A * | 10/1998 | Dunn et al. .................. 709/224 |
| 5,909,549 A * | 6/1999 | Compliment et al. ........ 709/223 |
| 5,933,647 A * | 8/1999 | Aronberg et al. ............ 717/178 |
| 6,035,423 A * | 3/2000 | Hodges et al. ................ 714/38 |
| 6,125,390 A * | 9/2000 | Touboul ...................... 709/223 |
| 6,272,677 B1 * | 8/2001 | Lam et al. ................... 707/203 |
| 6,282,568 B1 * | 8/2001 | Sondur et al. .............. 370/254 |
| 6,314,555 B1 * | 11/2001 | Ndumu et al. ................ 706/49 |

OTHER PUBLICATIONS

Muller, Nathan J. "Focus On OpenView: A Guide to Hewlett-Packard's Network and Systems Management Platform"; CBM Books; 1995; pp. 1-4, 37-38, 58-63, 67-69, 163-167, 179-182, and 242-251.*
Want, Henry Haojin; "Telecommunications Network Management"; McGraw-Hill; 1999; pp. 26.*
"Dictionary of Computing"; Fourth Edition; Oxford University Press; 1996; pp. 11.*
"Microsoft Computer Dictionary"; Third Edition; Microsoft Press; 1997; pp. 19.*

* cited by examiner

*Primary Examiner*—Kakali Chaki
*Assistant Examiner*—William H. Wood

(57) ABSTRACT

A managing computer manages applications residing on a managed computer. An agent is forwarded from the managing computer to the managed computer. The agent runs on the managed computer. The agent maintains specified applications residing on the managed computer. The agent also performs requests made by the managing computer.

9 Claims, 3 Drawing Sheets

DEPLOYED AGENT USED IN THE INSTALLATION AND MAINTENANCE OF SOFTWARE

BACKGROUND

The present invention concerns deployment of software to desktop computers and pertains particularly to a deployed agent used in the installation and maintenance of software.

There are many ways computers linked together in a local area network (LAN) can run applications. Applications can be run from a central location such as a server. Alternatively, applications can be installed on individual computers. Each method has benefits and drawbacks.

For example, when applications are run from a central server, this greatly simplifies the maintenance of the applications. However, one drawback of running applications from a central server is that this requires a lot of network bandwidth. Also, because of lost network connections, applications can fail intermittently.

When applications are run on individual computers, this reduces the amount of network bandwidth required. Also, lost network connections do not necessarily lead to application failures on individual computers. However, maintaining applications on individual computers is more complicated. It is difficult to ensure sufficient access and privilege to manage, from a central location, different applications residing in many computers.

Automated software distribution systems can provide a solution to some of the aforementioned problems. However, depending upon how this is done, it can result in many additional problems.

SUMMARY OF THE INVENTION

In accordance with the preferred embodiment of the present invention, a managing computer manages applications residing on a managed computer. An agent is forwarded from the managing computer to the managed computer. The agent runs on the managed computer. The agent maintains specified applications residing on the managed computer. The agent also performs requests made by the managing computer.

In the preferred embodiment, the agent detects lost network connections. The agent also monitors network connection speed between the managed computer and the managing computer to determine a best time to transfer data from the managing computer to the managed computer. In one embodiment, the agent stops all network applications on the managed computer when the network connection speed is below a predetermined threshold. The agent also can monitor the integrity of specified applications within the managed computer to ascertain when repair is needed. The agent also downloads and installs specified applications from the managing computer to the managed computer.

The agent monitors communications from the managed computer to determine when the managed computer desires the agent to take a requested action. The requested action can be, for example, to uninstall an application, to stop an application or to upgrade an application.

The present invention greatly simplifies the maintenance, from a central location, of applications distributed on many different computer systems.

DESCRIPTION OF THE PREFERRED EMBODIMENT

Figure 1:
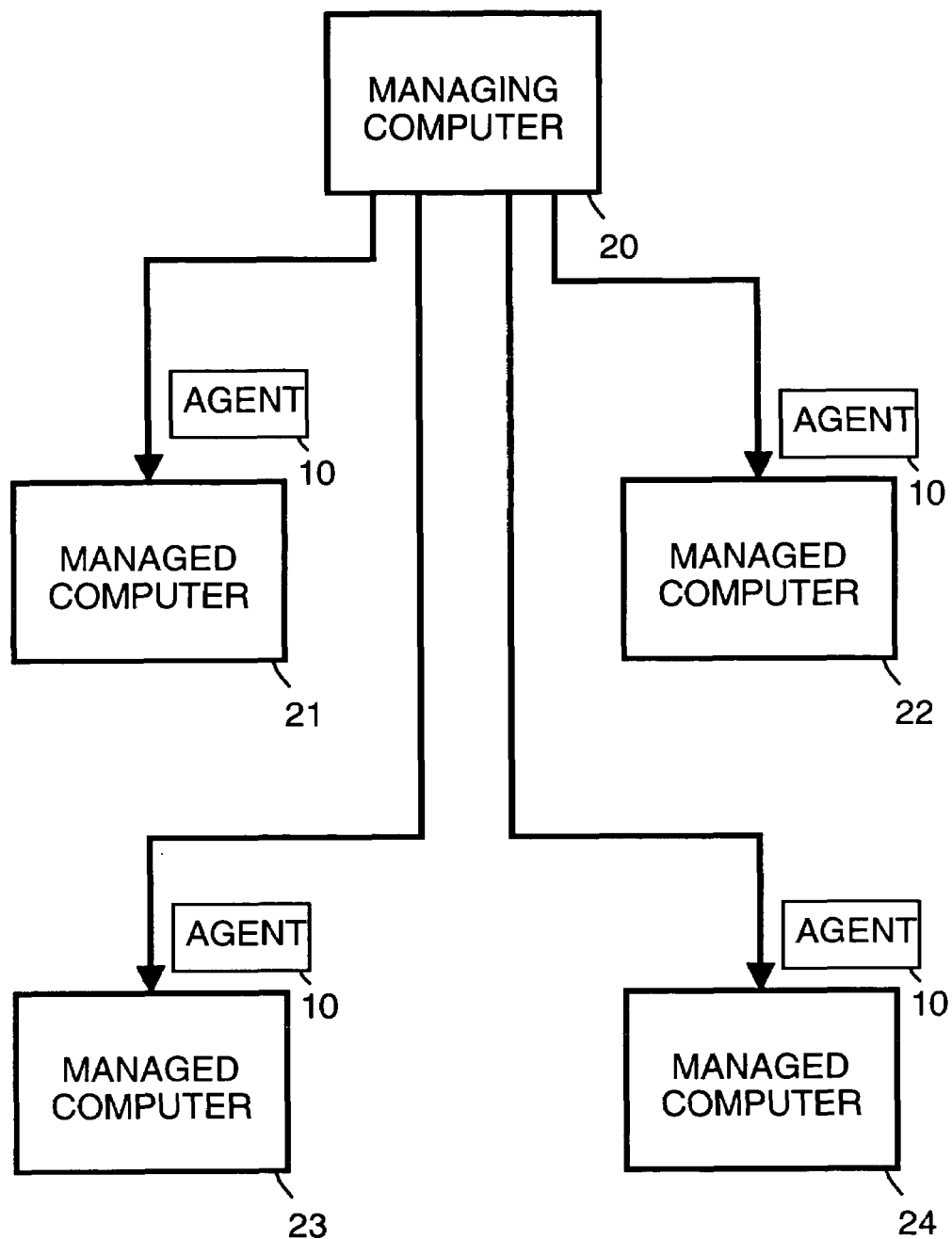
FIG. 1 illustrates distribution of agents from a managing computer to managed computers in accordance with a preferred embodiment of the present invention.

FIG. 1 illustrates distribution of an agent 10 from a managing computer 20 to a managed computer 21, a managed computer 22, a managed computer 23 and a managed computer 24. Agent 10 is used for software distribution and maintenance in accordance with a preferred embodiment of the present invention.

Agent 10 is "pushed" or "pulled" from managing computer 20 to managed computers 21 through 24. Agent 10 then installs itself on each of managed computers 21 through 24 based on the configuration of agent 10 and the platform on which managed computers 21 through 24 run.

For example, managed computers 21 through 24 are on a list of specified attended and unattended computers targeted by managing computer 20. If any of managed computers 21 through 24 are shut off, managing computer 20 will periodically check the shut off managed computer and will push the agent to the managed computer as soon as managing computer 20 detects the managed computer is turned on.

Figure 2:
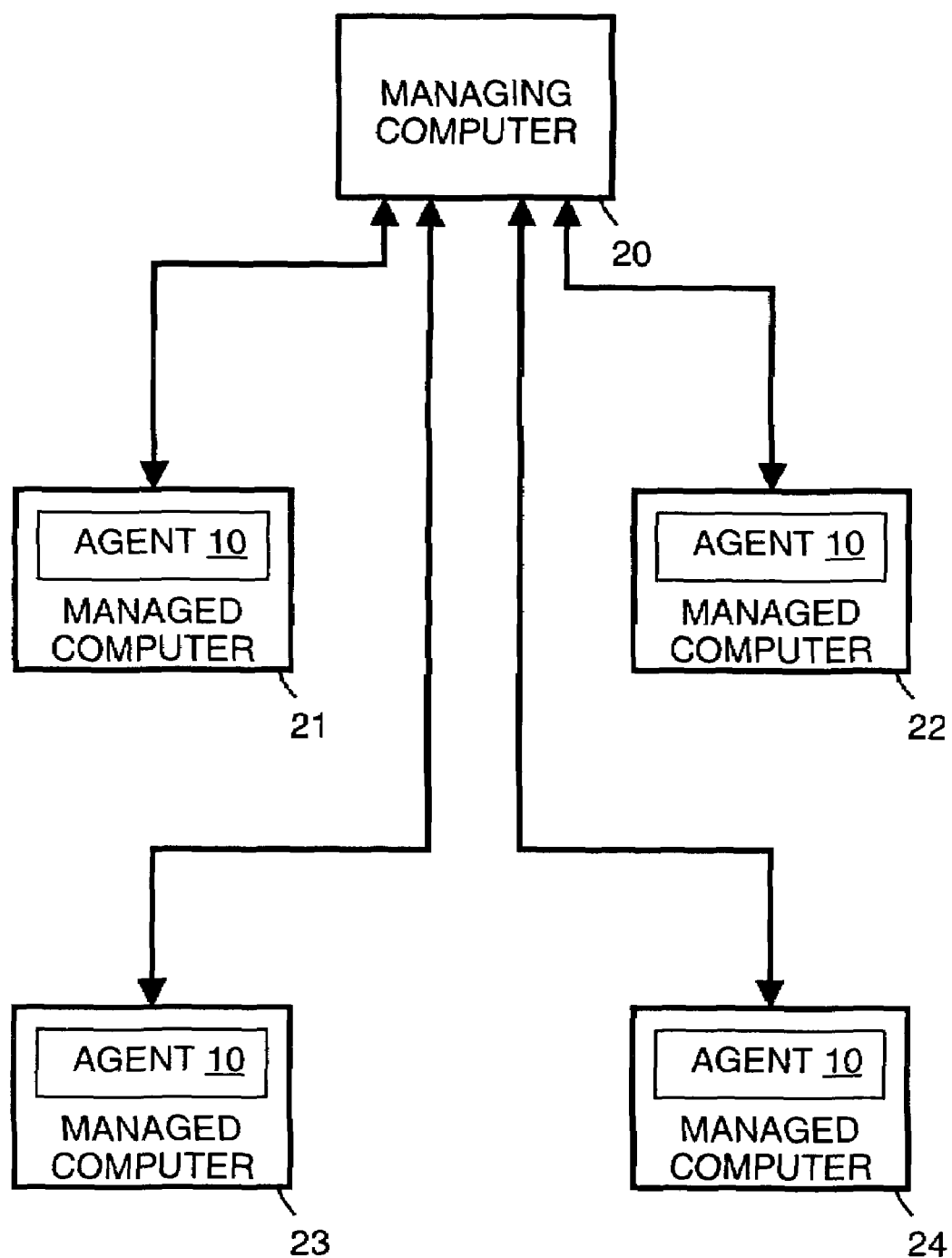
FIG. 2 illustrates information flow between agents located within managed computers and a managing computer in accordance with a preferred embodiment of the present invention.

FIG. 2 shows agent 10 residing, after installation, within all of managed computers 21 through 24. Agent 10 performs self-maintenance within managed computers 21 through 24. In addition, depending upon the capability and configuration of agent 10, agent 10 installs and maintains specified applications and agents within each of managed computers 21 through 24. Maintenance includes, for example, making updates to the specified applications when new versions are available on the managing computer. Agent 10 also performs requests issued from managing computer 21 through 24.

In addition, agent 10 detects and provides remedies of abnormal conditions within managed computers 21 through 24. For example, agent 10 detects lost network connections. When a lost network connection is detected, agent 10 stops network applications to reduce impact on network performance. Agent 10 also detects integrity problems and performs necessary repairs.

Figure 3:
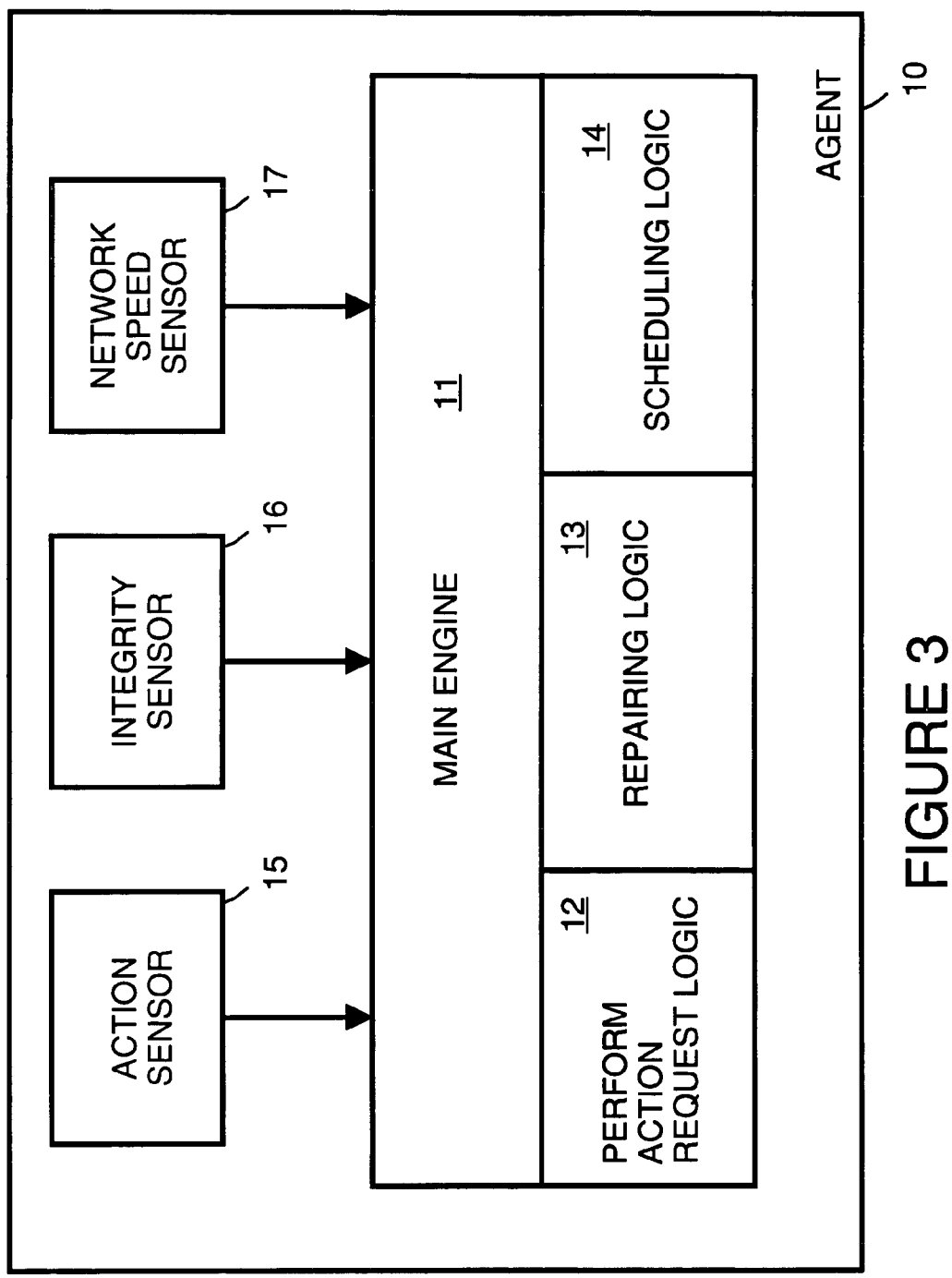
FIG. 3 shows a block diagram of an agent used for software distribution and maintenance in accordance with a preferred embodiment of the present invention.

FIG. 3 is a block diagram of agent 10 after installation. Agent 10 includes a network speed sensor 17, an integrity sensor 16 and an action sensor 15 all interfacing to a main engine 11, as shown. Main engine 11 includes perform action request logic 12, repairing logic 13 and scheduling logic 14.

Network speed sensor 12 signals main engine 11 when to pull down application files, and when to start and stop an application agent. Integrity sensor 16 signals main engine 10 to repair a particular agent and/or applications. Action sensor 15 signals main engine 11 when an action is requested.

Table 1 below lists simplified pseudo code that illustrates functionality of network speed sensor 17:

TABLE 1

```
/***Monitor the connection speed between client (managed
    computer) and server. ***/
CheckNetworkThreshold (Threshold Bit/Sec)
{
 While ( not terminate)
 {
        Mark StartTime
        Read X number of bytes from Compress file on server.
        Mark EndTime.
        AccessRate = (X * 8 bits) / EndTime – StartTime
        If (AccessRate > Threshold)
            Set NetworkThreshold Event below Specified Threshold.
            Wait For Acknowledgment.
        Else
            Sleep for number of secs
        Continue
 }
  Quit.
}
```

Table 2 below lists simplified pseudo code that illustrates functionality of integrity sensor 16:

TABLE 2

```
/***Detect if any specified integrity has been violated, such
    as a missing file, a registry deleted, an application
    uninstalled***/
CheckForIntegrity ( List of Item to check)
{
    While ( not terminate)
    {
        For ( n = FirstItem to LastItem)
        {
            If ( nItem not Exist)
            {
                Set Integrity Event
                Wait For Acknowledgment.
            }
        }
        Sleep for number of secs.
    }
}
```

Table 3 below lists simplified pseudo code that illustrates functionality of action sensor 15:

TABLE 3

```
/*Monitors if any action has been issued.*/
CheckForActionRequest( )
{
    While ( not Terminate)
    {
      If ( Receive Action request notification)
      Case Action request:
      {
         Uninstall:
              Set Event Uninstall
              Quit.
           Stop an application:
              Set Event Stop application X.
           Upgrade:
              Set Event Upgrade.
      }
        Sleep for n secs
    }
      Quit.
}
```

Table 4 below lists simplified pseudo code that illustrates functionality of main engine 11:

TABLE 4

```
/*** Monitors a set of events and perform task accordingly***/
While ( not Terminate)
{
    If (NetworkThreshold Event is set)
    {
        Stop all network applications.
        Reset NetworkThreshold Event}
    If ( Integrity Event set)
    {
        Perform repairing process
        Reset Integrity Event
    }
    If ( ActionRequest Event set)
    {
      Case ( ActionRequest Event)
        Uninstall Event Set:
            Stop all applications
            Perform Uninstall.
            Quit.
        StopApplication Event Set:
            Stop specified application.
            Reset ActionRequest Events.
        Upgrade Event Set:
            Stop All applications.
            PerformUpgrade.
            Reset Upgrade Event.
    }
    Perform Scheduling, this process determines start or stop an
  application.
        Sleep for n secs.
}
```

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method by which a managing computer manages applications residing on a managed computer, the method comprising the step of:
   (a) forwarding an agent from the managing computer to the managed computer, the agent, upon arriving at the managed computer, performing the following:
   (a.1) installing itself on the managed computer; and,
   (a.2) maintaining specified applications residing on the managed computer, including:
   making updates to the specified applications when new versions of the specified applications are available on the managing computer.

2. A method as in claim 1 wherein in step (a) the agent additionally performs the following:
   (a.3) detecting lost network connections.

3. A method as in claim 1 wherein in step (a) the agent additionally performs the following:
   (a.3) monitoring network connection speed between the managed computer and the managing computer to determine a best time to transfer data from the managing computer to the managed computer.

4. A method as in claim 1 wherein in step (a) the agent additionally performs the following:
   (a.3) monitoring integrity of specified applications within the managed computer to ascertain when repair is needed.

5. A method as in claim 1 wherein in step (a) the agent additionally performs the following:

(a.3) monitoring communications from the managing computer to determine when the managing computer desires the agent to take a requested action.

6. A method as in claim 5 wherein in substep (a.3) the requested action is to uninstall an application.

7. A method as in claim 5 wherein in substep (a.3) the requested action is to stop an application.

8. A method as in claim 1 wherein in step (a) the agent additionally performs the following substeps:
- (a.3) monitoring network connection speed between the managed computer and the managing computer; and,
- (a.4) stopping all network applications on the managed computer when the network connection speed is below a predetermined threshold.

9. A method as in claim 1 wherein in step (a) the agent additionally performs the following substeps:
- (a.3) downloading a specified application from the managing computer to the managed computer; and,
- (a.4) installing the specified application.

\* \* \* \* \*